(12) United States Patent
Vempati et al.

(10) Patent No.: US 8,034,147 B2
(45) Date of Patent: Oct. 11, 2011

(54) COMPLETE PLANT GROWTH MEDIUM

(75) Inventors: Rajan K. Vempati, Plano, TX (US);
Ramesh S. Hegde, Plano, TX (US);
John J. Sloan, Plano, TX (US)

(73) Assignee: ChK Group, Inc., Plano, TX (US)

( * ) Notice: Subject to any disclaimer, the term of this patent is extended or adjusted under 35 U.S.C. 154(b) by 961 days.

(21) Appl. No.: 11/943,293

(22) Filed: Nov. 20, 2007

(65) Prior Publication Data

US 2008/0116141 A1 May 22, 2008

Related U.S. Application Data

(60) Provisional application No. 60/866,615, filed on Nov. 21, 2006.

(51) Int. Cl.
*C05D 9/00* (2006.01)
*C05D 9/02* (2006.01)

(52) U.S. Cl. .................. 71/1; 47/58.1 SC; 71/31; 71/32; 71/54; 71/903

(58) Field of Classification Search .................. 210/691, 210/660, 690; 71/903, 31–64.13, 1, 32, 54; 47/48.5, 58.1 SC
See application file for complete search history.

(56) References Cited

U.S. PATENT DOCUMENTS

| | | | | |
|---|---|---|---|---|
| 1,518,570 A * | 12/1924 | Cowles | ............................. | 71/61 |
| 4,810,280 A * | 3/1989 | Le Van Mao et al. | ............. | 71/62 |
| 5,106,405 A * | 4/1992 | Goto | .................................. | 71/7 |
| 5,695,542 A * | 12/1997 | Chang | ............................... | 71/33 |
| 6,887,828 B2 * | 5/2005 | Allen et al. | .................... | 504/120 |
| 6,921,732 B2 * | 7/2005 | Vempati | .......................... | 502/66 |
| 7,186,344 B2 * | 3/2007 | Hughes | .......................... | 210/652 |
| 2004/0099027 A1 * | 5/2004 | Rohwer | ............................. | 71/31 |
| 2007/0029259 A1 * | 2/2007 | Kakita et al. | ................... | 210/660 |

OTHER PUBLICATIONS

Lo, C.P., D.A. Quattrochi, and J.C. Luvall. 1997. Application of high-resolution thermal infrared remote sensing and GIS to assess the urban heat island effect. J. Remote Sensing. 18:287-304.
North Carolina Cooperative Extension Service. 2004. Residential Landscaping. Publication AG-248. http://ipm.ncsu.edu/urban/horticulture/res_landscaping.html.
Ohio State University Extension. 2004. Growing Cucumbers, Peppers, Squash and Tomatoes in Containers. Fact Sheet HYG-1645-94. http://ohioline.osu.edu/hyg-fact/1000/1645.html.
U. S. Patent No. 6,921,732 B2. 2005. Vempati, R. K. Method of Manufacturing a coated zeolite adsorbent.
U.S. Patent No. 5,452,242. 1995. Ming et al. Active Synthetic Soil.
U.S. Patent No. 5,433,766. 1995, Ming et al. Slow-Release Fertilizer.

* cited by examiner

*Primary Examiner* — Wayne Langel
(74) *Attorney, Agent, or Firm* — Charles D. Gunter, Jr.

(57) ABSTRACT

A naturally occurring zeolite is coated with a special nanophase Fe oxide, thereby forming a nanophase Fe oxide coated zeolite. The composition thus formed can be used for a variety of horticultural and floricultural end applications. When the nanophase Fe oxide coated zeolite is dosed with plant nutrients and is then mixed with a suitable potting compound, the result is a Complete Plant Growth Medium (CPGM). Blending 5% to 25% CPGM by weight with sand, peat, compost, vegetable and flower beds, and native and manufactured soils, provides a number of beneficial properties. Also, CPGM alone can be used for growing indoor plants to avoid plant pests and compost odor.

6 Claims, 4 Drawing Sheets

| 100:0 | 75:25 | 50:50 | 25:75 | CONTROL 1 |
| COMPOST: | COMPOST: | COMPOST: | COMPOST: | COMMERCIAL |
| ZEOLITE | ZEOLITE | ZEOLITE | ZEOLITE | MIXTURE |

US 8,034,147 B2

COMPLETE PLANT GROWTH MEDIUM

CROSS REFERENCE TO RELATED APPLICATIONS

The present invention claims priority from a provisional application Ser. No. 60/866,615, filed Nov. 21, 2006, entitled "Complete Plant Growth Medium For Golf Greens, Floricultural and Horticultural Applications", by the same inventors.

BACKGROUND OF THE INVENTION

1. Field of the Invention

The present invention relates to a plant growth medium made from a zeolite coated with nanophase Fe oxide which can be used in a variety of different end applications, e.g., being loaded with a complete spectrum of agronutrients necessary for plant growth, making the medium useful for a variety of floricultural and horticultural applications.

2. Description of the Prior Art

One area in which a horticultural/floricultural adjunct, e.g., a complete plant growth medium of the type under consideration, could be used to advantage is in the area of "urban horticulture." Urban horticulture is the practice of growing ornamental plants, vegetables, fruits, and turf in an urban setting. These plants may be grown in native soil, highly-modified beds (manufactured soil), or containers. Abundant and healthy urban vegetation is an important resource for mitigating the urban heat island phenomena that is becoming increasingly prevalent in large metropolitan areas (Lo, C. P., D. A. Quattrochi, and J. C. Luvall. 1997. "Application of high-resolution thermal infrared remote sensing and GIS to assess the urban heat island effect." J. Remote Sensing. 18:287-304). In terms of food production, urban vegetable gardening can play a small but important role in helping supply cities with a fresh source of food products. Such a "companion food security movement," is touted as promoting urban-rural linkages and has been demonstrated to be an important part of the urban life in fulfilling the food needs, psychological and physiological health, social cohesion, crime prevention, recreation, and life satisfaction, especially of low-income communities (Hynes, H. P. and G. Howe. 1993. International Conference on Urban Horticulture. http://www.actahort.org/books/643/643_21.htm, Aug. 24, 2004). A dimension of the urban horticulture that has not been given adequate attention so far, however, is the availability or lack of availability of a good local support system by the city governments and/or the enhancement of its service capability to the community at large. A suitable plant growth medium, of the type under consideration, could help to address these needs and could be used in urban horticulture to save precious and scarce water resources, as well as avoiding excess fertilizer usage, thereby preventing nitrogen and phosphorous run off into the municipal sewer system.

One use for a plant growth medium of the type under consideration would be for container growing of plants in urban horticulture. There are multiple reasons why it is important to have container grown plants in an urban setting. Homeowners often have limited garden space or have soil that is not well suited for growing horticultural plants. Homes and businesses are often constructed on marginal soils that have unsuitable physical and chemical properties, such as high pH, or high clay contents, making them impermeable and slow to drain. It is often difficult to grow healthy plants in urban soils because the soils contain large amounts of construction debris, such as mortar, bricks, sheetrock, plywood, plastic, and other leftovers from the home building/improvement activities (North Carolina Cooperative Extension Service. 2004. Residential Landscaping. Publication AG-248. http://ipm.ncsu.edu/urban/horticulture/res_landscaping.html, Aug. 24, 2004). Growing plants in containers protects the homeowner from distasteful or unsuccessful modification of the landscape that might discourage potential home buyers in the event that the property goes on sale. In order for cities to mitigate the harmful heat island phenomena, it will become increasingly important that they be able to grow plants in containers so that they can establish cooling vegetative zones in such places as roadsides, parking lots, and rooftops.

Because the plants are grown in containers, one can prepare the container-mix to the exact requirements of a plant for better growth and production (Ohio State University Extension. 2004. "Growing Cucumbers, Peppers, Squash and Tomatoes In Containers." Fact Sheet HYG-1645-94. http://ohioline.osu.edu/hyg-fact/1000/1645.html, accessed Aug. 24, 2004). Accordingly, the mix (soil-mix/potting-mix/container-mix) should be loose and well drained, and should contain a generous amount of organic matter. This is typically achieved by mixing potting soil, perlite, sphagnum moss, and compost in appropriate proportions. Garden soil is generally avoided because it is much heavier than organic blends and it might contain damaging plant pests, but if garden soil is used, as some would prefer, it is important to use appropriate amendments to make sure the final mix has physical characteristics suitable for plant growth.

Despite the above recognized needs, presently available natural and synthetic plant growth mediums have suffered from various deficiencies or disadvantages when considered for use in the urban setting. For example, sphagnum peat moss is a widely used and important component of potting mixes sold in United States horticulture markets. The principal use of peat is to provide the bulky organic component of the growing medium. Sphagnum peat moss is less commonly used as a minor component of amendments for improving soil physical properties.

In 1999, the U.S. consumed on the order of 1.5 million tons of peat as one of the potting mix ingredients. Currently, U.S. imports peat from Canada and Ireland, but due to environmental restriction in these countries these imports may be restricted or even eliminated. Furthermore, peat is biodegradable and has a limited life span.

Another common potting mix ingredient is perlite, a mineral that has negative exchange sites and does not have the ability to retain anions.

A need exists, therefore, for a horticultural/floricultural adjunct, e.g., a complete plant growth medium which is superior to both peat and perlite in that the zeolite component in the mix is non biodegradable, helps buffer the mix, and retains both cationic and anionic plant nutrients.

SUMMARY OF THE INVENTION

The Complete Plant Growth Medium (CPGM) of the invention is based upon a natural zeolite coated with 1% nanophase Fe oxide (NPFZ). The CPGM can be applied to golf greens and can be used in a variety of other horticultural and floricultural applications. The NPFZ loaded with all plant nutrients, termed as CPGM, has following advantages, 1) retains both cationic and anionic form of plant nutrients, 2) exhibits excellent filtration and water holding capacity, resulting in scarce and precious water savings, 3) serves as a good soil conditioner, 4) prevents nutrients from leaching and/or runoff, 5) increases fertilizer use efficiency; thereby, significantly decreasing the number of fertilizer applications, 6) has the ability to capture nutrients from wastewater and liquid animal waste, and 6) has the ability to use poor quality water for crop production. Blending 5% to 25% CPGM by weight with sand, peat, compost, vegetable and flower beds, and native and manufactured soils, will provide the above beneficial properties. Also, CPGM alone can be used for growing indoor plants to avoid plant pests and compost odor.

In the method of the invention, the above described CPGM is used to provide a method for supplying nutrient elements in a horticultural or floricultural process. The method includes the steps of (1) modifying a naturally occurring zeolite by coating the naturally occurring zeolite with nanophase Fe oxide, thereby forming a nanophase Fe oxide coated zeolite; (2) bringing the nanophase Fe oxide coated zeolite into contact with the roots of a plant being grown in the horticultural or floricultural process; and (3) contacting the plant roots with water.

Preferably, the nanophase Fe oxide zeolite is a surface zeolitized fly ash coated nanophase Fe oxide. The surface zeolitized fly ash which has been coated with nanophase Fe oxide can be dosed with a convenient source of agronutrient, for example, a solution which contains elements of a complete synthetic fertilizer mix including N, P, Ca, Mg, S, Fe, Zn, Mn, Mo, B and Cu.

In one end use, at least about 5% and up to about 25% or more by volume of the surface zeolitized fly ash coated nanophase Fe oxide is mixed with a potting medium to form a plant growth medium. When the nanophase Fe oxide coated zeolite is dosed with suitable plant nutrients, both cationic and anionic, the addition of nanophase Fe oxide zeolite to a plant growth medium serves to prevent leaching and runoff, as well a retention of water, thereby resulting in decreased number of irrigations for plant survival. The nanophase Fe oxide coated zeolite can be dosed with 3 or more times the recommended dosage of an agronutrient fertilizer, thereby reducing the number of fertilizer applications necessary. The nanophase Fe oxide coated zeolite can also be mixed with sand and applied to golf courses to prevent excess fertilizer and water usage. The nanophase Fe oxide coated zeolite, without dosing with sorbed plant nutrients, can also be used itself as a slow-release fertilizer.

Additional objects, features and advantages will be apparent in the written description which follows.

DETAILED DESCRIPTION OF THE INVENTION

The present invention uses a special nanophase Fe oxide which is coated onto a specially selected zeolite material to produce an end composition which is useful in a variety of plant growth situations. The nanophase Fe oxide which is used in the practice of the present invention can theoretically be coated onto any ion exchanger, e.g., natural or synthetic fibers, perlite, clays, zeolitized fly ash, etc., including light weight coconut fibers, or even onto non-ion exchangers. However, coating to non-ion exchangers, i.e., sand and fly ash, will likely result in separation of sand and colloid nanophase Fe oxide during watering, leading to the latter moving out of the root zone, material settling at the bottom of the pot, or leaching out of the pot or container. Thus, the preferred forms of the plant growth medium of the invention are based upon a Nanophase Fe Oxide Coated Zeolite (referred to herein as "NPFZ"). The composition of one preferred zeolite, a naturally occurring mineral, will first be summarized, followed by a description of the nanophase Fe oxide coating process, as generally described in Applicant's issued U.S. Pat. No. 6,921,732 B2.

Zeolites are composed of $AlO_4$ and $SiO_4$ tetrahedra network, with each tetrahedral unit sharing the oxygen atoms. In addition, some of the tetravalent Si is replaced by trivalent Al, giving rise to a net negative charge in the framework (see Equation 1 below). These negative charges provide sites for adsorption of positive metallic ions (e.g., Cs, Sr, Cu, Pb, Zn, etc.). Zeolites are represented by the general formula:

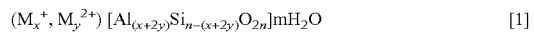

$$(M_x^+, M_y^{2+}) [Al_{(x+2y)}Si_{n-(x+2y)}O_{2n}]mH_2O \qquad [1]$$

where parentheses indicate exchangeable ions and brackets indicate structural ions.

The typical formula of a zeolite is $(Na_2, K_2) Al_2O_3\ 10SiO_2\ 8H_2O$ with Si/Al ratios ranging from 4 to 5 and a density of 2.16 g cc$^{-1}$. There are more than 50 natural and 200 synthetic zeolites. The pores and channels in the zeolite structures provide rapid diffusion of ions in solution. The size of the pore or channel opening depends on the structure of zeolites (see, Breck, D. W. 1974. Zeolite Molecular Sieve. John Wiley and Sons, Inc. N. York).

Zeolites possess high surface areas, reactive pore sites, high cation exchange capacities (CEC) and cation selectivity. They are good adsorbents because they: (1) act as molecular sieves, and (2) contain large void fractions.

By "natural zeolites" Applicants thus mean those naturally occurring in geological formations that are mined. Whereas "surface zeolitized fly ashes" are synthesized from fly ash (a coal combustion by-product, which is generated by thermal power plants).

Figure 1:
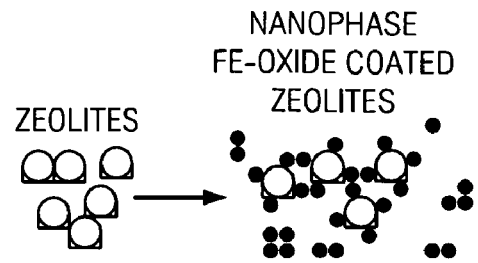
FIG. 1 is a schematic of the surface modification of natural zeolites with nanophase Fe oxide.

Applicants' special Nanophase Fe oxide Coated Natural Zeolite (NPFZ) will now be described. Natural zeolites, due to the presence of negative sites on their surface or exchange sites, do not adsorb anions. Hence, for purposes of the present invention, Applicants propose to modify these surfaces by coating with nanophase Fe oxides (see FIG. 1). The projected particle size of these oxides will preferably be in the range of 10 nm to 50 nm. These are x-ray amorphous, do not exhibit any crystalline Fe oxide Fourier Transform Infrared (FTIR) bands, and hence, have high surface area (350 to 450 m$^2$ g$^{-1}$) and reactivity. The nanophase Fe oxides are capable of sorbing ions by two processes: (1) physical, referred to as electrostatic bonding, and (2) chemical, referred to as chemisorptions or covalent bonding.

To better understand the nature of the charge on the oxide surface, it is instructive to review the concept of zero point of charge (ZPC). The ions chemisorbed at the surface of the adsorbent constitute the potential-determining ions (PDI), which establish the charge on the oxide surfaces. The surface charge ($\sigma_s$) for a monovalent salt is given by:

$$\sigma_s = F(\Gamma_{M+} - \Gamma_{A-}) \qquad [2]$$

where $\Gamma_{M+}$ and $G_{A-}$ are the adsorption densities of the potential determining cations and anions, respectively and F is the Faraday constant (see Equation 2). The potential determining ions are usually composed of $H^+$ and $OH^-$. The concentration of the PDI and the net charge are dependent on the pH of the medium, which is zero when the densities of the positive and negative charges are equal. The activity at which the PDI is zero is called the ZPC. When $H_+$ and $OH^-$ are the PDI, the ZPC is expressed in terms of pH and it is designated as $pH_{ZPC}$. The $pH_{ZPC}$ is characteristics of a particular oxide, for example the ZPC of amorphous Fe oxide is 8.2. When the $pH > pH_{ZPC}$ the surface is negative, cations are adsorbed; conversely, when $pH < pH_{ZPC}$ the surface is positive, anions are adsorbed.

The cation and anion adsorption processes on the nanophase Fe oxides are shown in Equations 3 and 4:

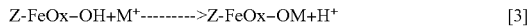

$$Z\text{-}FeOx\text{-}OH + M^+ \longrightarrow Z\text{-}FeOx\text{-}OM + H^+ \qquad [3]$$

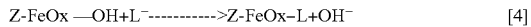

$$Z\text{-}FeOx\text{-}OH + L^- \longrightarrow Z\text{-}FeOx\text{-}L + OH^- \qquad [4]$$

where Z, FeOx, $M^+$ and $L^-$ refer to zeolite, nanophase Fe oxides, cation and anion, respectively. The specific adsorption involving a covalent bonding mechanism retains ions more strongly than electrostatic or physical adsorption mechanism.

The preferred class of natural zeolites which have been selected for purposes of practicing the present invention will now be described. Even though any hydrophilic zeolite with a cation exchange capacity (CEC) of >100 cmols per Kg and particle size in the range of 0.3-0.8 mm would likely be acceptable in terms of a suitable candidate for use in the method of the invention, Applicants prefer to use a natural zeolite mostly composed of clinoptilolite, a type of clay, the main reason being its abundance. Clinoptilolite has a CEC in the range of 100 to 120 cmols kg$^{-1}$, with the exchange sites dominated by $Ca^{2+}$ and $Mg^{2+}$. This zeolite is stable up to 973 K. Deposits of clinoptilolite are present in abundance in Texas, New Mexico and Idaho.

Nanophase Fe oxide without coating with sorbed plant nutrients can be used as a slow-release fertilizer. However, the preferred NPFZ of the invention captures plant nutrients, both cationic and anionic, prevents leaching and runoff, and retains water resulting in a decreased number of required irrigations, thereby saving scarce and precious water resources. This makes the preferred NPFZ materials of the invention ideally suited for urban horticulture. The following experiments which follow were carried out using Applicants' special Nanophase Fe oxide Coated Zeolite (NPFZ).

Test Protocol Materials and Method of Preparation

For purposes of the present invention, a suitable zeolite was coated with 1% of the nanophase Fe oxide to form the NPFZ. In order to determine the optimal plant nutrient sorption on 1% NPFZ, a "surface zeolitized" fly ash was coated with 1% nanophase Fe oxide and various doses of nutrients were added to optimize the nutrients levels. As will be understood by those skilled in the relevant arts, by the term "surface zeolitized" fly ash, Applicants mean, e.g., Class 'F' Fly Ash, a coal combustion byproduct, that has been surface zeolitized at 70 C. for <4 his in a basic solution. This surface zeolitized fly ash is then treated with FeCl$_3$ solution using the basic teachings described in Applicants' issued U.S. Pat. No. 6,921, 732 B2 to manufacture 1% nanophase Fe oxide coated surface zeolitized fly ash.

Based on these studies, adding three times the dosage of nutrients per acre, the NPFZ was able to hold these nutrients with minimal leaching. However, this dosage can be increased or decreased based on the plant requirement, and the plant nutrients composition of the compost, peat or soils.

In preferred applications, the NPFZ is mixed with a potting compound in select percentages to produce a complete plant growth medium (referred to herein as "CPGM"). The complete plant growth mediums (CPGM's) of the invention offer several advantages as compared to the currently available potting soils. Current commercially available potting mixes have to be watered daily and fertilized regularly. They also have a limited life span due to the continued decomposition of the organic ingredients. A NPFZ-compost mix performs better than the currently available potting mixes because of the following:

Natural zeolites improve the physical characteristics of the mix by creating a texture and bulk density that is favorable for good plant growth. Additionally, zeolites have high CEC and when coated with nanophase iron oxide, have the capability to sorb anions as well. NPFZ seems to have a moderating influence on soil pH; hence, favorable conditions for plant growth can be accomplished by mixing in appropriate proportion with compost. Coating of the natural zeolite with nanophase Fe oxide (CPGM) will enable simultaneous sorption of cationic and anionic nutrients on the exchange sites, thereby preventing leaching of plant nutrients—added exogenously to the growth medium during plant growing or those released during the compost mineralization process—to ground and surface water bodies.

Additional advantages include the fact that the NPFZ materials of the invention do not degrade/decompose with time; hence, never need to be replenished. The compositions are also environmentally-friendly: they offers a benign alternative to the use of environmentally-unsustainable sphagnum peat moss that largely makes up the potting mix currently available in the market.

Applicants also wish to point out several differences in the CPGM of the invention and the so-called Zeoponic System of the prior art. In the mid-1990's, a "Zeoponic" system was developed at the Johnson Space Center, NASA, Houston, Tex. In that system, natural zeolite (clinoptilolite) is saturated with $NH_4^+$ and $K_+$ (see, Ming, D. W., D. L. Henninger, E. R. Allen and D. C. Golden. 1995. Active synthetic soil; U.S. Pat. No. 5,451,242). and mixed with apatite, a calcium phosphate system containing essential trace plant nutrients, e.g., Mg, S, Ca, Fe, Mn, B, Zn, etc. (Ming, D. W. and Golden, D. C. 1995. Slow release fertilizer; U.S. Pat. No. 5,433,766). The dissolution mechanism of Ca and P from apatite is attributed to an ion exchange process. Studies suggest that this system has problems in releasing P for plant uptake. The present technology differs from the Zeoponic system as described above for the following reasons:

Applicants' previously described nanophase Fe oxide is coated on the zeolite material (NPFZ) to provide amphoteric charge properties, and complete plant nutrients are sorbed on the NPFZ.

Applicants are unaware of any other commercial product that will compete with NPFZ-based complete plant growth medium. The other apparent competing products are slow-release fertilizers such as Osmocote, Miracle-gro, etc., but these are not plant growth media. Applicant's material is a plant growth medium with nutrients supplying/holding capabilities. Other advantages of NPFZ-based complete growth medium over sand are: (a) less fertilizer applications because of good nutrient retention, (b) less watering due to good water holding capacity, and (c) the possibility of using poor-quality water. Because of these advantages, NPFZ-based complete growth medium may be used to replace sand in a number of horticultural or floricultural applications, for example, in golf greens.

The following study was undertaken to illustrate CPGM's water retention characteristics:

TABLE 1

Enhancement of water retention by sand and sand: CPGM blends.

| Growth medium | Water retention (%) after | |
|---|---|---|
| | 48 hours | 7 days |
| Sand (control) | 26 | 22 |
| Sand (89%): NPFZ (11%) | 30 | 25 |
| Sand (78%): NPFZ (22%) | 35 | 31 |

The role of NPFZ in enhancing water retention was tested by saturating the sand:NPFZ blends and then measuring the water content gravimetrically. The data (see Table 1 above) show that NPFZ clearly enhanced water retention, which would be an added benefit when it is used as part of the potting mix with compost. It should also be noted that the water retention is, however, not to the extent of saturation/waterlogging which is detrimental to plant growth.

Table 2 below is intended to show a comparison of fertilizer composition and dosage, and plant nutrients removal by selected extractants from the CPGM of the invention. Leaching the NPFZ sorbed nutrients with 0.01M $CaCl_2$ resulted in release of $K^+$ and $Mg^+$, and very little of ammonical-N only (see Table 2). This is anticipated as $Ca^{2+}$ has the ability to displace by K and Mg through an ion exchange process. Release of negligible amounts of N and P indicates that these nutrients are tightly held, and will not contribute to pollution of wastewaters. The Mehlich test is a harsher test (uses dilute acids) compared to 0.01M $CaCl_2$ and even with this extraction no significant amounts of P were released indicating that it is tightly bound to the NPFZ surfaces, however, the release of ammonium ions were anticipated.

TABLE 2

Fertilizer composition and dosage, and plant nutrients removal by selected extractants from complete plant growth medium.

| | | Fertilizer Composition | | |
|---|---|---|---|---|
| Nutrient | Percent | Fertilizer Dosage 3X | 0.01M $CaCl_2$ Extractable mg/kg | Mehlich (III) Extraction |
| Nitrogen | 15.0 | 180.00 | | |
| Ammonium | 5.8 | 68.00 | 4.0 | 84.0 † |
| Urea | 9.2 | 112.00 | | ND |
| $P_2O_5$ | 30.0 | 360.00 | 0.0 | 0.00 |
| $K_2O$ | 15.0 | 180.00 | 71.0 | 3.08 |
| Ca ‡ | | 100.00 | 0.0 | 1.86 |
| Mg ‡ | | 100.00 | 23.9 | 0.012 |
| S | 0.20 | 200.00 | 0.0 | 0.09 |
| Fe | 0.15 | 1.80 | 0.0 | 0.33 |
| Mn | 0.05 | 0.60 | 0.0 | 0.012 |
| Cu | 0.07 | 0.83 | 0.0 | 0.00 |
| B | 0.02 | 0.24 | 0.0 | 0.034 |

TABLE 2-continued

Fertilizer composition and dosage, and plant nutrients removal by selected extractants from complete plant growth medium.

| | | Fertilizer Composition | | |
|---|---|---|---|---|
| Nutrient | Percent | Fertilizer Dosage 3X | 0.01M $CaCl_2$ Extractable mg/kg | Mehlich (III) Extraction |
| Zn | 0.06 | 0.72 | 0.0 | 0.001 |
| Mo | 0.0005 | 0.006 | 0.0 | 0.00 |

†1M KCl leached
‡Fertilizer solution did not contain these nutrients
ND = Not determined Next, Applicants conducted a Mehlich III Soil Test on NPFZ Loaded with Plant Nutrients. The plant available nutrients in the 1×, 2×, and 3× mixes were determined using Mehlich III extractants. The composition of the extractant was 0.2M $CH_3COOH$—0.25N $NH_4NO_3$—0.015 N $NH_4F$—0.013N $HNO_3$—0.001M EDTA (Mehlich, 1984). Since $NH_4F$ and $HNO_3$ acid were used in the procedure, the available $NH_4$ was determined by 1 N KCl method. The amount of 1 N KCl extractable $NH_4$ is slightly more than the added amount (see Table 2) which may be due to urea hydrolysis. No P was detected in the extract, which may be due to the fact that F— is not competitive to remove phosphate bound to amorphous Fe oxide. Vempati (1988) showed that P bound to the amorphous Fe oxide can be removed by 0.1 M NaOH only because the extractant dissolves significant amount of amorphous Fe oxide. This is due to the fact that at pH>8.5 Fe start to dissolves from the Fe containing minerals (Lindsay, 1979).

Figure 2:
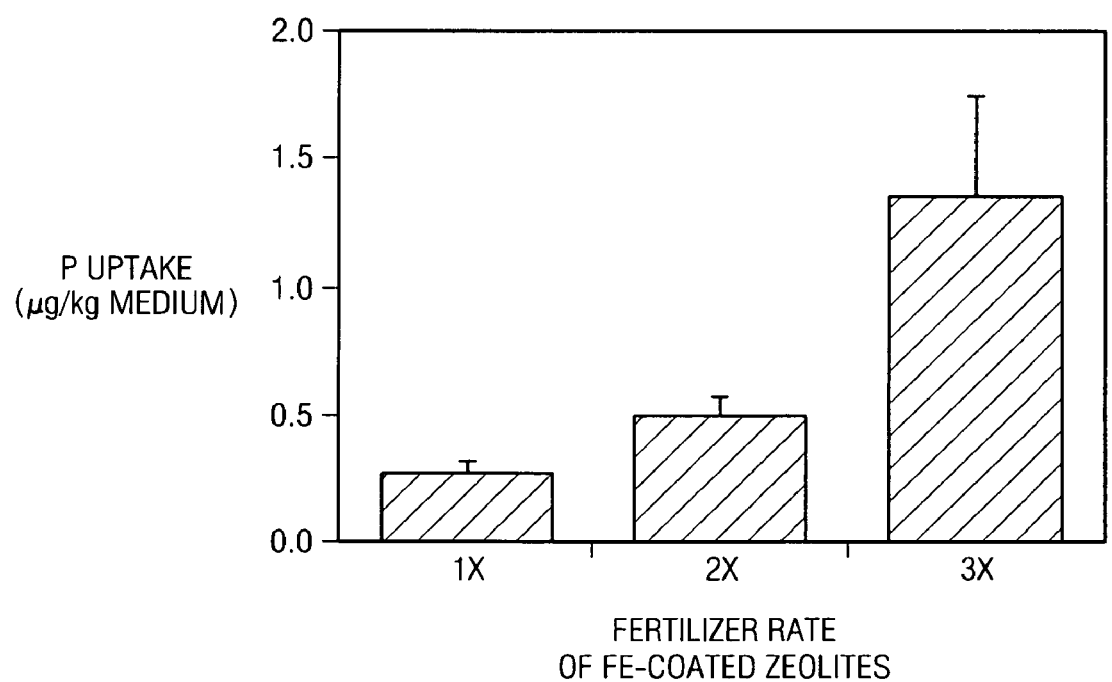
FIG. 2 is a graph of plant uptake of fertilizer from the plant medium of the invention where the medium is treated with different plant nutrient levels.

However, the analysis of plant tissues on plants grown in 1×-3× mixes showed the presence of significant amounts of P in the plants (see FIG. 2). Moreover, there was no visual (purpling of leaves) indicating P deficiency in the plants.

In order to further evaluate the efficacy of Applicant's compositions in the area of greenhouses and home gardening applications, several greenhouse studies were performed using Verbena, lettuce, turf grass, tomatoes, banana peppers, etc. and home gardening using tomatoes, okra, bell peppers, cucumber, etc. The verbena studies are briefly summarized below.

Verbena in NPFZ-Plano Pure Compost Blends

Preliminary plant growth studies were conducted, to determine if NPFZ-Plano Pure compost would be a suitable potting mix for container growing of Verbena. Plants were grown in 6" diameter pots that contained 1.3 kg of potting mix (NPFZ: compost blends and controls).

Various zeolite: Plano Pure compost blends were prepared as follows:
0% NPFZ: 100% Plano Pure compost (w/w)
5% NPFZ: 95% Plano Pure compost (w/w)
25% NPFZ: 75% Plano Pure compost (w/w)
50% NPFZ: 50% Plano Pure compost (w/w)
75% NPFZ: 25% Plano Pure compost (w/w)

Figure 3:
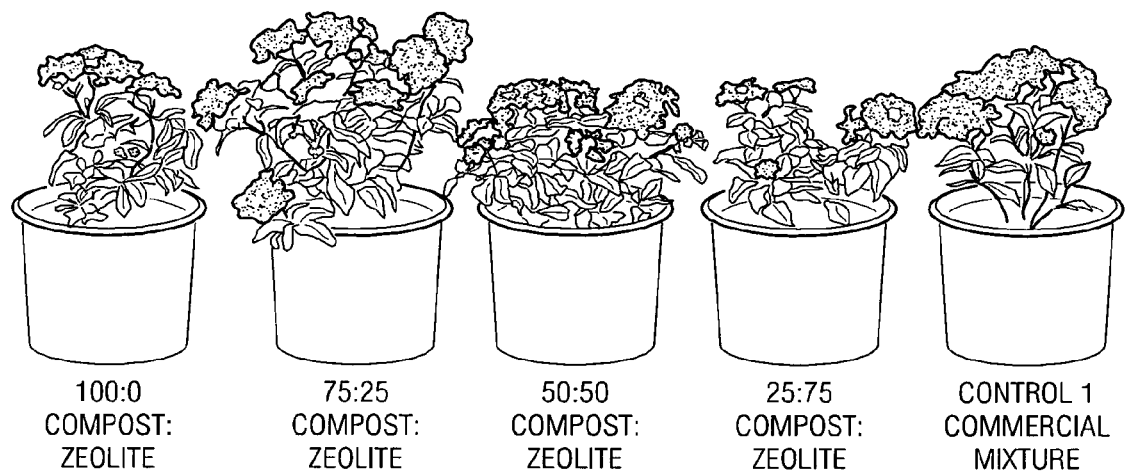
FIG. 3 is a photograph of ornamental verbena grown in various mixtures of the plant growth medium of the invention and compost where the proportion of medium to compost is varied.

There were two controls: a native soil control and a commercially available, enriched potting mix control. Each of the six treatments was replicated four times, so that we had a total of 24 experimental units (pots). Fertilization and watering was done per standard greenhouse plant growth protocols. Plant growth of verbena was monitored over a two-month period and the results are given in the table which follows and in FIG. 3. The results show that 25% NPFZ:75% Plano Pure compost was the best of all mixes. The 5% NPFZ:95% Plano Pure compost performed equally as well.

Golf Course Study

Figure 4:
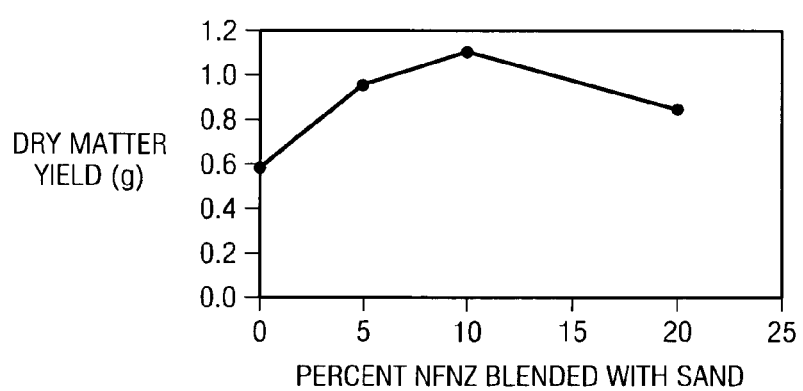
FIG. 4 is a graph of dry matter yield versus the percent of the plant growth medium of the invention blended with sand.

The Verbena study was then followed by a Blended Sand and NPFZ Study to determine is such mixtures would be useful, for example, in various golf course applications. A preliminary greenhouse study was conducted to determine if the Sand and NPFZ blend will improve plant yield and fertilizer retention. FIG. 4 is a graph of dry matter yield versus the percent nanophase Fe oxide coated zeolite which is blended with dry sand. FIG. 4 shows that the dry matter yield increased dramatically in pots containing NPFZ in the range of 33% to 48%. The 10% NPFZ and 90% sand did the best. However, the yield difference between 5% and 10% NPFZ is insignificant. Also, the blended NPFZ was able to retain major plant nutrients (NPK) compared to control (100% sand) (Data not shown). Further, the bentgrass was green and healthy in the NPFZ blended sand.

Greenhouse Study with Nanophase Fe Oxide Coated Natural Zeolite (NPFZ)-Based Complete Growth Medium.

Figure 5:
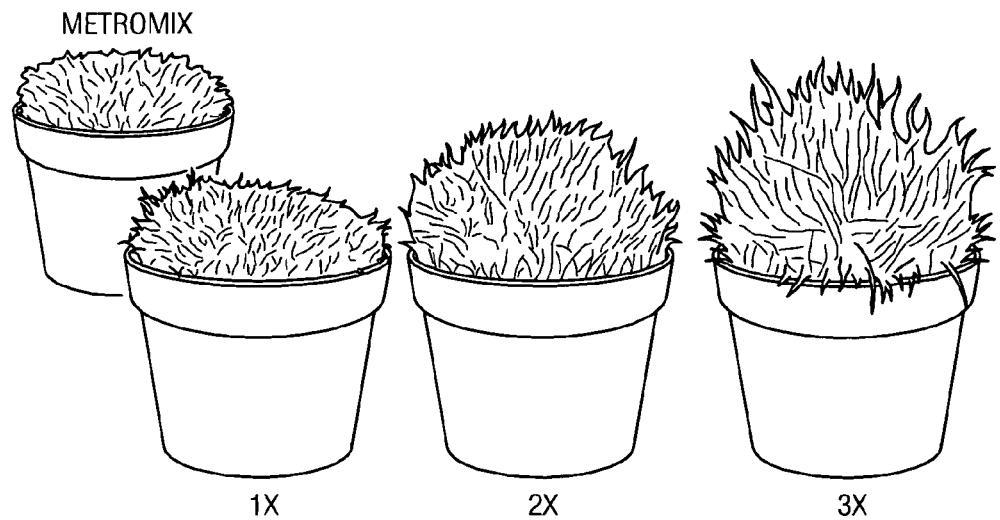
FIG. 5 is a photograph of three containers of Bentgrass grown in the plant medium of the invention after 60 days as compared to the growth of the same grass grown in a Metromix control.

Next, greenhouse experiments were conducted with the 1×-3× nutrient dosage loaded with 100% NPFZ using bentgrass. FIG. 5 shows the plant growth at the end of two-month growth period. The following results were obtained as a result of the study findings:

No fertilizer applications were needed for over three months in the 3× pots. Note that the Metromix (control) pot had fertilizer applied every 15 days as recommended.

The grass was green and healthy.

The grass had a shallower root growth in 3× compared to other treatments. Most of the roots concentrated on the surface compared to longer root growth in 1× and 2× pots.

As stated previously, the use of 100% NPFZ for construction will be prohibitively expensive; therefore, based on the preliminary greenhouse study Applicants are proposing to blend sand with 0%, 5%, 10% and 20% NPFZ for turf grass applications. The preliminary greenhouse studies showed that:

One percent Fe coating on the natural zeolite appears to be ideal to be used as a growth medium.

In the present study no plant nutrients stress/toxicity was observed in the bentgrass.

$CaCl_2$ leaching tests showed that only some $K^+$ was leached from NPFZ

The bent grass grown on NPFZ loaded with 3× dosage produced higher amounts of biomass compared to the other treatments.

Turf Grass Studies, Preparation of Hoagland Solution

A standard Hoagland solution was used to prepare a multi-nutrient growth medium. Hoagland solution is a complete synthetic fertilizer mix containing N, P, K, Ca, Mg, S, Fe, Zn, Mn, Mo, B, and Cu. Nitrogen was added in both ammonium (cationic) and nitrate (anionic) forms. The amount of fertilizer added to the Fe oxide coated surface zeolitized fly ash (SZFA) was based on 120 lbs of N and 150 lbs of P per acre basis. This amount was met by adding eight mL of Hoagland solution, concentration of that was thrice the amount, to all the above treatments before planting Bermuda grass.

Figures 6A, 6B, 6C, 6D, 6E:
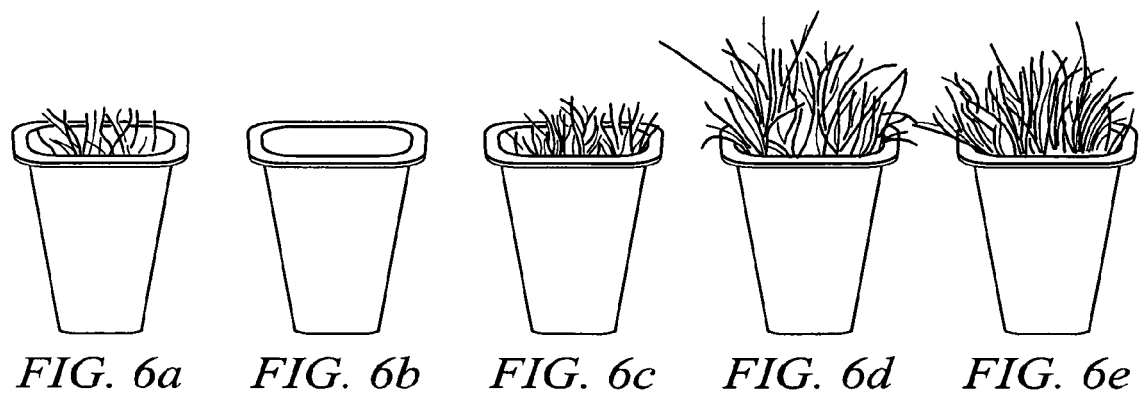
FIG. 6 is a photograph of Bermuda grass grown in fly ash and zeolitized fly ash with no Fe as compared to Bermuda grass grown in one of the plant mediums of the invention showing the comparative growth rates after 30 days.
Figures 7A, 7B, 7C, 7D, 7E:
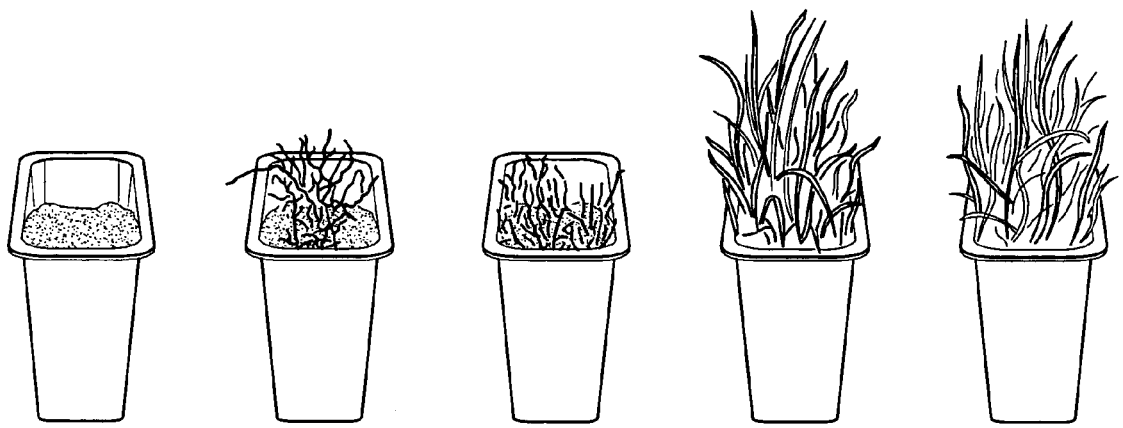
FIG. 7 is a photograph similar to FIG. 6, but showing 120 day old Bermuda grass grown in the previously described mediums.

The following observations were made on the plant growth (see FIGS. 6 and 7 of the drawings):

The seeds in the surface zeolitized fly ash containing pots did not germinate at all (see FIG. 6 and FIG. 7). The plants may have not survived due to nitrate toxicity, since the materials cannot sorb nitrate (anions).

Seeds in the control fly ash partially germinated in two pots. The growth of the grass was much slower compared to other Fe oxide treated growth media. Similar to surface zeolitized fly ash, the plant in the fly ash may have not survived due to nitrate toxicity, since the fly ash materials sorb nitrate (anions).

The turf grasses in the Fe-oxide coated fly ash grew slowly up to 30 days of plant growth (FIG. 6) but did not survive after 120 days of plant growth (FIG. 7).

Figure 8:
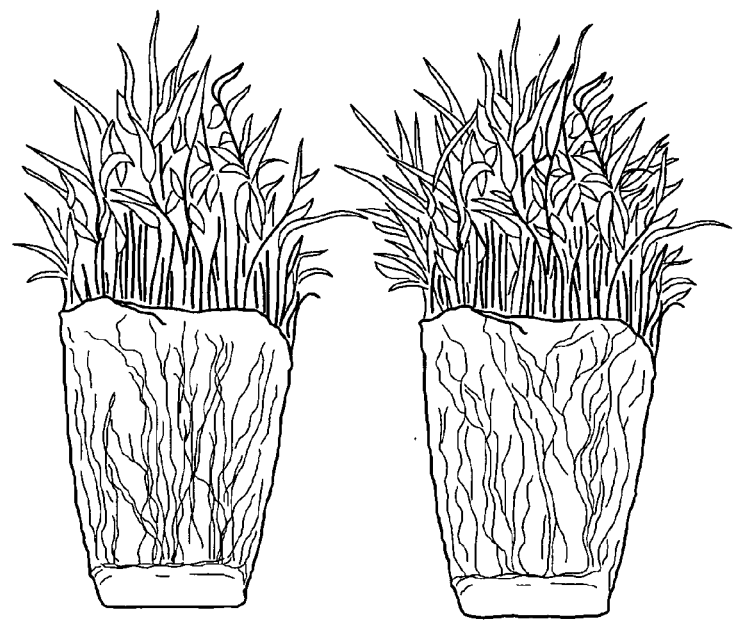
FIG. 8 is a photograph showing the Bermuda grass roots where the grass was grown in 10% Fe oxide coated zeolitized fly ash.

The turf grasses grew best in the 10% Fe oxide coated zeolitized fly ash followed by the 1% Fe oxide coated surface zeolitized fly ash (FIGS. 6 and 7). However, slight purpling of the leaves due to P deficiency was observed after 15 days of growth (FIG. 6). Fertilizing the pots with 50 lbs of N and P per acre, alleviated the problem. Also, profuse root growth was observed in the 10% Fe oxide treated surface zeolitized fly ash (FIG. 8). The NPZFA ash had excellent water holding capacity and it exhibited similar physical properties as sand.

An invention has been provided with several advantages. Applicants' CPGM offers a number of advantages over currently available plant growth mediums:

A CPGM blend will provide a starter dose of nutrients to the plant, capture mineralized plant nutrients from compost preventing loss and/or run off, and retains water. Most of all, the application of CPGM to urban horticulture will save precious and scarce water resources, and avoid excess fertilizer usage, e.g., N and P and prevent their run off. Furthermore, a study has shown that plants grown in CPGM mixed in compost survived drought conditions compared to compost grown.

At least 5% of CPGM should preferably be blended with other potting mixture to achieve the most beneficial results. In the above studies 5% CPGM added to compost also performed well. The selected applications of CPGM are listed below:

Replace sand in putting greens in golf courses.

Indoor plants.

Blend CPGM with municipal compost.

Apply to vegetable and flowering beds

Container pots.

Roof and/or terrace gardening.

Lasagna gardening.

The benefits for the home or professional gardener include:

Early flowering and fruiting resulting in increased plant yield.

Supplements the growing medium for indoor plants, vegetables and flower-beds which are primarily composed of manufactured or native soils.

Serves as a potting medium or blend with municipal compost.

Replacing sand in golf greens.

Increases fertilizer and water efficiency; thereby, decreasing the risk of pollution due to excessive fertilization and watering.

Non-biodegradable; therefore, has long-term benefits.

Depleted CPGM can be replenished with a plant nutrient solution.

Supplies starter dose of nutrients (CPGM with compost blend).

Improves physical properties of soils by increasing water infiltration, drainage, and aeration to the roots.

In urban landscaping decreases the leaching of phosphorus and other nutrients into sewer or storm water drains.

While the invention has been described in several of its forms, it is not thus limited, but is susceptible to various changes and modifications without departing from the spirit thereof.

We claim:

1. A method for supplying nutrient elements in a horticultural or floricultural process, the method comprising the steps of:
   modifying a naturally occurring zeolite by coating the naturally occurring zeolite with nanophase Fe oxide, thereby forming a nanophase Fe oxide coated zeolite;
   dosing the nanophase Fe oxide coated zeolite with at least one selected plant nutrient;
   bringing the nutrient dosed nanophase Fe oxide coated zeolite into contact with the roots of a plant being grown in the horticultural or floricultural process; and
   contacting the plant roots with water.

2. A method for supplying nutrient elements in a horticultural or floricultural process, the method comprising the steps of:
   modifying a synthetic zeolite by coating the synthetic zeolite with nanophase Fe oxide, thereby forming a nanophase Fe oxide coated zeolite;
   dosing the nanophase Fe oxide coated zeolite with at least one selected plant nutrient;
   bringing the nutrient dosed nanophase Fe oxide coated zeolite into contact with the roots of a plant being grown in the horticultural or floricultural process;
   contacting the plant roots with water; and
   wherein the synthetic zeolite which is coated with the nanophase Fe oxide is a surface zeolitized fly ash.

3. The method of claim 2, wherein the surface zeolitized fly ash which has first been coated with the nanophase Fe oxide to form the nanophase Fe oxide coated zeolite is thereafter dosed with an agronutrient which contains elements of a complete synthetic fertilizer mix including N, P, Ca, Mg, S, Fe, Zn, Mn, Mo, B and Cu.

4. The method of claim 3, wherein at least about 5% by volume of the surface zeolitized fly ash which has first been coated with the nanophase Fe oxide to form the nanophase Fe oxide coated zeolite and thereafter dosed with an agronutrient is mixed with a potting medium to form a plant growth medium.

5. The method of claim 1, wherein the naturally occurring zeolite which has been coated with nanophase Fe oxide to form the nanophase Fe oxide coated zeolite is thereafter dosed with selected plant nutrients, both cationic and anionic, and mixed with a potting compound to form a complete plant growth medium, the addition of nanophase Fe oxide coated zeolite to the plant growth medium serving to prevent leaching and runoff, as well a retention of water, thereby resulting in decreased number of irrigations being required for plant survival.

6. The method of claim 1, wherein the naturally occurring zeolite which has been coated with nanophase Fe oxide to form the nanophase Fe oxide coated zeolite and which has subsequently been dosed with at least one selected plant nutrient is thereafter mixed with sand and applied to golf courses to prevent excess fertilizer and water usage.

* * * * *